(12) United States Patent
Nanninga et al.

(10) Patent No.: US 6,719,815 B2
(45) Date of Patent: Apr. 13, 2004

(54) FUEL COMPOSITION

(75) Inventors: Gerrit Leendert Nanninga, Giessen (NL); Jan Van Breugel, Woudrichem (NL)

(73) Assignee: Purac Biochem B.V. (NL)

(*) Notice: Subject to any disclaimer, the term of this patent is extended or adjusted under 35 U.S.C. 154(b) by 7 days.

(21) Appl. No.: 10/169,121

(22) PCT Filed: Dec. 22, 2000

(86) PCT No.: PCT/NL00/00950

§ 371 (c)(1), (2), (4) Date: Sep. 18, 2002

(87) PCT Pub. No.: WO01/60954

PCT Pub. Date: Aug. 23, 2001

(65) Prior Publication Data

US 2003/0061761 A1 Apr. 3, 2003

(30) Foreign Application Priority Data

Dec. 27, 1999 (NL) .............................................. 1013964

(51) Int. Cl.$^7$ .................................................. C10L 1/18
(52) U.S. Cl. ............................. 44/401; 44/402; 44/400; 44/438
(58) Field of Search .......................... 44/400, 401, 402, 44/438

(56) References Cited

U.S. PATENT DOCUMENTS

| 1,296,902 | A | * | 3/1919 | Backhaus | ..................... 44/308 |
| 4,451,266 | A | * | 5/1984 | Barclay et al. | ................ 44/308 |
| 4,762,946 | A | | 8/1988 | Ritter et al. | |

FOREIGN PATENT DOCUMENTS

| GB | 1 525 804 | | 9/1978 |
| GB | 2090611 | * | 4/1982 |
| JP | 61127792 | * | 6/1986 |
| WO | WO 95/02654 | | 1/1995 |

* cited by examiner

*Primary Examiner*—Cephia D. Toomer
(74) *Attorney, Agent, or Firm*—Gilberto M. Villacorta; Serge Sira; Katten Muchin Zavis Rosenman

(57) ABSTRACT

The invention relates to a fuel composition which comprises a diesel fuel, a $C_1$–$C_4$ alkyl ester of an α-hydroxymonocarboxylic acid and, if appropriate, a $C_1$–$C_4$ alcohol. The diesel fuel is either obtained from petroleum or from a petroleum fraction, such as middle distillate, or is obtained by conversion of material of biological origin (so-called biodiesel). The fuel composition preferably contains from 3 to 6% by weight of $C_1$–$C_4$ alkyl ester, calculated on the basis of the total weight of the composition.

9 Claims, No Drawings

FUEL COMPOSITION

RELATED APPLICATIONS

This application claims priority to PCT Patent Application No. NL00/00950, filed Dec. 22, 2000, which claims priority to Netherlands Patent Application No. 1013964, filed Dec. 27, 1999, both of which are incorporated herein by reference.

The invention relates to a fuel composition which comprises a diesel fuel, a $C_1$–$C_4$-alkyl ester of an α-hydroxymonocarboxylic acid and, if appropriate, a $C_1$–$C_4$-alcohol. The diesel fuel is either obtained from petroleum or from a petroleum fraction, such as a middle distillate, or is obtained by conversion of material of biological origin (so-called biodiesel). The fuel composition is particularly suitable as a fuel for diesel engines. If the fuel composition comprises biodiesel, it is particularly suitable for use for simultaneously operating engines and heating devices, such as heaters on a ship.

Diesel fuels have to satisfy a number of specifications. According to ASTM D-975, it is possible to distinguish between three types of diesel fuel, namely 1-D for high-speed diesel engines which operate under greatly fluctuating conditions in terms of speed and load, 2-D, which is a general-purpose diesel fuel, and 4-D, which is a more viscous diesel fuel which is generally used in low-speed diesel engines. Low-speed diesel engines of this type generally run at a constant speed and under a constant load. One of the important specifications for diesel fuels is the flash point. The flash point represents the temperature below which a fuel can be handled without being at risk of catching fire. In other words, in connection with a possible fire risk, the flash point of the diesel fuel must not be too low. On the other hand, the flash point of the diesel fuel must not be too high, as in this case the diesel fuel is difficult or impossible to ignite, since at this temperature there are too few volatile components. The flash point is measured in accordance with ASTM D-93, and the flash point specifications for 1-D, 2-D and 4-D are 38° C., 52° C. and 55° C., respectively: Kirk-Othmer, Encyclopedia of Chemical Technology, Fourth Edition, Volume 12, pp. 373–383 (1994).

JP A 61-127792 discloses fuel compositions for diesel engines containing lactate esters as combustion improvers.

It is known to add oxygen-containing compounds, such as esters of vegetable oils, ethers and alcohols, to diesel fuel in order to improve the combustion of the diesel fuel and to lower the emissions of carbon monoxide and particles WO 95/02654 discloses that mixtures of ethanol, diesel fuel and an fatty acid or an ester thereof has an acceptable burning capacity, wherein the fatty acid or the ester thereof is used as an emulsifier to prevent compatibility problems.

For example, ethanol could also be used to lower the flash point. However, ethanol has the considerable drawback of being a very volatile compound, the actual concentration of which in the diesel fuel is difficult to regulate and maintain at a constant level (ethanol has a boiling point of 78° C. and a vapour pressure of 59 mbar at 20° C.). Moreover, ethanol has a relatively low flash point and even a very small amount of ethanol is sufficient to considerably lower the flash point: the addition of, for example, 1% by weight ethanol to a diesel fuel obtained from petroleum or a petroleum fraction leads to the flash point being lowered by approximately 25° C., which generally leads to a diesel fuel with an excessively low flash point. Ethanol as such is therefore unsuitable as an agent for lowering the flash point Various diesel fuels can be used as the base material for the fuel composition. The diesel fuel may be produced from a petroleum or a petroleum fraction, but is preferably produced by conversion of material of biological origin (so-called biodiesel).

Biodiesels with various flash points are used However, the flash point of most biodiesels is too high, and consequently they cannot be used for diesel fuel compositions with a low flash point, such as those of type 1-D and 2-D. The invention provides a solution to these problems.

It has now been found that $C_1$–$C_4$-alkyl esters of a-hydroxymonocarboxylic acids are very suitable agents for lowering the flash point of diesel fuels, in particular of biodiesels. Examples of esters of this type are the methyl, ethyl, n-propyl, i-propyl, n-butyl, s-butyl, i-butyl and t-butylesters of carboxylic acids, such as lactic acid. The ester is preferably ethyl lactate (boiling point 154° C., vapour pressure at 20° C. is 2.2 mbar). A further advantage is that the addition of these esters increases the oxygen content thereby providing an improved combustion and less soot formation.

According to the invention, the fuel composition also contains a $C_1$–$C_4$-alcohol. Examples of an alcohol of this type include methyl alcohol, ethyl alcohol, n-propyl alcohol, i-propyl alcohol, n-butyl alcohol, s-butyl alcohol, i-butyl alcohol and t-butyl alcohol. The alcohol is preferably ethanol.

The fuel composition preferably comprises from 3 to 6% by weight, in particular 4 to 5% by weight, $C_1$–$C_4$-alkyl ester, calculated on the basis of the total weight of diesel fuel and alcohol. If present, the fuel composition preferably also contains from 0.05 to 1.0% by weight, in particular 0.1 to 0.5% by weight, $C_1$–$C_4$-alcohol, calculated on the basis of the total weight of diesel fuel, ester and alcohol. It has been found that it is advantageous for the fuel composition to contain both the ester and the alcohol, since at ambient temperature all the components (diesel fuel, alcohol and ester) in any ratio produce a completely homogeneous fuel composition with a pour point which is lower than 0° C. and often even lower than 4° C. Moreover, it has been found that the effect of the alcohol, in particular of ethanol, of considerably reducing the flash point can be lessened by the addition of the ester.

The fuel composition preferably also contains one or more fatty acids for stabilising the flash point. It has been found that the following fatty acid composition is eminently suitable:

free fatty acid content: approximately 80% by weight
fatty acid derivatives: approximately 20% by weight
fatty acid composition: 0.1% by weight C14:0, 6% by weight C16:0 (pahuitic acid), 0.4% by weight C16:1, 0.2% by weight C18:0, 57% by weight C18:1 (oleic acid), 22% by weight C18:2 (Oinoleic acid), 7% by weight C18:3 (linolenic acid) and 0.2% by weight C22:1.

The fuel composition may furthermore contain the customary additives, such as agents which improve the cetane number, agents which improve the cold filter plugging point, ignition-promoting agents, agents which improve the pour point, detergents and rust-preventing agents.

If the ester is used for lowering the flash point of fuels (for example diesel fuel) which have been prepared from petroleum or petroleum fractions such as middle distillates, this may lead to two-phase systems being formed. This occurs, for example, if approximately 3% by weight of the ester (calculated on the basis of the total fuel composition) is added to the diesel fuel. By contrast, the formation of two-phase systems can be counteracted again by also adding a fatty acid or a mixture of fatty acids. The quantities of ester, alcohol and fatty acid or fatty acids which have to be added to fuels of this type in order to suitably lower the flash point lie within the same ranges.

EXAMPLE 1

Fuel compositions containing the following components were prepared, and the flash point of these compositions was determined in accordance with the method described in ASTM D-93 (ISL FP 93 5G). The diesel fuel was obtained from Shell (Nov. 8, 1999, 08.14 h, Giessen, The Netherlands). The specifications of the diesel fuel were as follows:

cloud point (seasonably dependent)
cold filter plugging point (EN 116; seasonably dependent)
cetane index (ASTM D4737): minimum 46
cetane number (ASTM D-613): minimum 49
density (ASTM D-4052): 820–860 kg/dm$^3$
maximum boiling point (ASTM D-86): maximum 370° C.
flash point (ASTM D-93): minimum 55° C.
sulphur content (ASTM D-2622): maximum 0.05% by weight
viscosity (ASTM D-445): minimum 2.0 mm$^2$/S
water content (ASTM E-1064): maximum 200 mg/l.

The fatty acid composition was obtained from Vogtrans (Fettsaüre Typ I, 816+781, 10.4.99). The ethanol was obtained from Merck (absolute, for analysis). The ethyl lactate was obtained from Purac (batch HK 435 GL). The following results were obtained (cf. Table 1):

TABLE 1

|  | Fatty acids (% by weight) | Ethanol (% by weight) | Ethyl lactate (% by weight) | Flash point (° C.) |
|---|---|---|---|---|
| 1 | 0.00 | 0.00 | 0.00 | 50.6 |
| 2 | 0.00 | 0.00 | 1.25 | 48.6 |
| 3 | 0.00 | 0.00 | 2.50 | 47.6 |
| 4 | 0.00 | 1.25 | 0.00 | 17.6 |
| 5 | 0.00 | 1.25 | 1.25 | 18.6 |
| 6 | 0.00 | 1.25 | 2.50 | 20.6 |
| 7 | 0.00 | 2.50 | 0.00 | 12.5 |
| 8 | 0.00 | 2.50 | 1.25 | 14.5 |
| 9 | 0.00 | 2.50 | 2.50 | 15.5 |
| 10 | 2.50 | 0.00 | 0.00 | 51.6 |
| 11 | 2.50 | 0.00 | 1.25 | 50.6 |
| 12 | 2.50 | 0.00 | 2.50 | 47.6 |
| 13 | 2.50 | 1.25 | 0.00 | 18.5 |
| 14 | 2.50 | 1.25 | 1.25 | 20.5 |
| 15 | 2.50 | 1.25 | 2.50 | 22.5 |
| 16 | 2.50 | 2.50 | 0.00 | 15.5 |
| 17 | 2.50 | 2.50 | 1.25 | 16.5 |
| 18 | 2.50 | 2.50 | 2.50 | 16.5 |
| 19 | 5.00 | 0.00 | 0.00 | 52.6 |
| 20 | 5.00 | 0.00 | 1.25 | 50.6 |
| 21 | 5.00 | 0.00 | 2.50 | 49.6 |
| 22 | 5.00 | 1.25 | 0.00 | 20.5 |
| 23 | 5.00 | 1.25 | 1.25 | 22.5 |
| 24 | 5.00 | 1.25 | 2.50 | 24.5 |
| 25 | 5.00 | 2.50 | 0.00 | 16.5 |
| 26 | 5.00 | 2.50 | 1.25 | 17.5 |
| 27 | 5.00 | 2.50 | 2.50 | 19.5 |
| 28 | 2.50 | 1.25 | 1.25 | 20.5 |
| 29 | 2.50 | 1.25 | 1.25 | 20.5 |
| 30 | 2.50 | 1.25 | 1.25 | 20.5 |

It is clear from the above table that in practice it is not possible to lower the flash point using ethanol.

Calculations have shown that the increase in the flash point brought about by ethyl lactate (2.50% by weight) and the fatty acid compositions (5.00% by weight) is negated by the addition of 0.12% by weight ethanol. When more than approximately 3% by weight ethyl lactate was added, segregation occurred at ambient temperature, which again could be negated by the addition of the fatty acid composition.

EXAMPLE 2

Fuel compositions comprising the following components were prepared, and the flash point of these compositions was determined in accordance with the method described in ASTM D-93 (ISL FP 93 5G). The biodiesel was obtained from Q8 (KPA 2536, Biodiesel/RME, RL98-1719). The fatty acid composition was obtained from Vogtrans (Fettsaüre Typ I, 816+781, 10.4.99). The ethanol was obtained from Merck (absolute, for analysis). The ethyl lactate was obtained from Purac (batch HK 435 GL). The following results were obtained (cf. table 2):

It emerged that, when ethanol and/or ethyl lactate was added, no segregation occurred, and consequently the addition of the fatty acid composition is not strictly necessary. The flash point can be lowered by adding ethyl lactate alone, although approximately 12% by weight ethyl lactate then has to be added in order to reduce the flash point from 170° C. to 70° C., which is not attractive from an economic point of view. This has the further drawback that the efficiency of combustion is reduced by approximately 6%. For practical reasons, according to the invention the flash point is preferably lowered by adding a mixture of ethanol and ethyl lactate.

ASPEN calculations have shown that ethyl lactate lowers the pour point of the fuel (if methyl oleate is the fuel, adding 10% by weight ethyl lactate lowers the pour point from 7.67° C. to −0.18° C.), which is an additional advantage since less pour point depressant has to be added.

TABLE 2

|  | Fatty acids (% by weight) | Ethanol (% by weight) | Ethyl lactate (% by weight) | Flash point (° C.) |
|---|---|---|---|---|
| 1 | 1.03 | 0.99 | 3.19 | 44.9 |
| 2 | 2.02 | 0.98 | 3.19 | 45.9 |
| 3 | 1.03 | 1.95 | 3.22 | 31.9 |
| 4 | 1.99 | 1.94 | 3.16 | 33.0 |
| 5 | 1.02 | 0.96 | 6.14 | 46.0 |
| 6 | 1.96 | 0.96 | 6.12 | 47.0 |
| 7 | 1.02 | 1.87 | 6.04 | 35.0 |
| 8 | 1.98 | 1.87 | 6.01 | 35.0 |
| 9 | 2.01 | 1.81 | 5.09 | 34.5 |
| 10 | 2.09 | 0.55 | 5.21 | 54.5 |
| 11 | 1.69 | 1.43 | 4.68 | 39.0 |
| 12 | 1.68 | 1.43 | 4.61 | 40.0 |
| 13 | 0.00 | 0.00 | 6.24 | 85.0 |
| 14 | 0.00 | 1.54 | 0.00 | 34.2 |
| 15 | 2.33 | 0.00 | 0.00 | 181.0 |
| 16 | 0.00 | 0.00 | 0.00 | 176.0 |
| 17 | 0.00 | 1.00 | 3.90 | 48.2 |
| 18 | 0.00 | 0.51 | 3.91 | 59.0 |
| 19 | 0.00 | 0.52 | 0.00 | 34.2 |
| 20 | 0.56 | 0.53 | 3.90 | 59.0 |
| 21 | 0.93 | 0.51 | 3.96 | 47.0 |
| 22 | 0.00 | 0.32 | 1.38 | 67.0 |
| 23 | 0.00 | 0.49 | 2.63 | 63.0 |
| 24 | 0.66 | 0.60 | 1.90 | 56.0 |
| 25 | 0.94 | 1.00 | 1.11 | 36.8 |
| 26 | 1.01 | 1.00 | 0.00 | 54.8 |
| 27 | 1.05 | 0.00 | 1.13 | 124.8 |
| 28 | 0.00 | 0.00 | 0.00 | 176.8 |
| 29 | 0.00 | 0.00 | 3.24 | 97.8 |
| 30 | 0.00 | 0.00 | 6.35 | 81.8 |
| 31 | 0.00 | 0.27 | 0.00 | 101.8 |
| 32 | 0.00 | 0.26 | 3.27 | 78.8 |
| 33 | 0.00 | 0.25 | 6.38 | 67.8 |

TABLE 2-continued

| | Fatty acids (% by weight) | Ethanol (% by weight) | Ethyl lactate (% by weight) | Flash point (° C.) |
|---|---|---|---|---|
| 34 | 0.00 | 0.53 | 0.00 | 77.8 |
| 35 | 0.00 | 0.51 | 3.29 | 63.8 |
| 36 | 0.00 | 0.50 | 6.39 | 57.8 |
| 37 | 0.00 | 0.26 | 3.22 | 77.8 |
| 38 | 0.00 | 0.26 | 3.21 | 76.8 |
| 39 | 0.00 | 0.00 | 3.28 | 96.8 |
| 40 | 0.00 | 0.53 | 0.00 | 62.8 |
| 41 | 0.00 | 0.53 | 0.00 | 72.8 |
| 42 | 0.00 | 0.53 | 0.00 | 67.8 |
| 43 | 0.00 | 1.05 | 0.00 | 42.8 |
| 44 | 0.00 | 1.03 | 3.22 | 43.8 |
| 45 | 0.00 | 0.98 | 6.13 | 46.8 |
| 46 | 0.00 | 0.00 | 11.84 | 70.8 |
| 47 | 0.00 | 0.94 | 11.99 | 50.7 |
| 48 | 0.00 | 0.78 | 0.00 | 48.12 |
| 49 | 0.00 | 0.77 | 3.18 | 49.1 |
| 50 | 0.00 | 0.69 | 9.22 | 52.1 |
| 51 | 0.00 | 0.73 | 6.46 | 50.2 |
| 52 | 0.00 | 0.87 | 3.21 | 46.2 |
| 53 | 0.00 | 0.39 | 5.13 | 61.2 |
| 54 | 0.00 | 0.41 | 3.87 | 62.2 |
| 55 | 0.00 | 0.31 | 3.21 | 68.2 |
| 56 | 0.00 | 0.49 | 2.62 | 59.2 |
| 57 | 0.00 | 0.99 | 2.94 | 43.2 |

What is claimed is:

1. A Fuel composition comprising a diesel fuel, a $C_1$–$C_4$-alkyl ester of an α-hydroxymonocarboxylic acid and 0.05 to 1.0% by weight of an $C_1$–$C_4$ alcohol, calculated on the basis of the total weight of the composition.

2. The fuel composition according to claim 1, wherein the diesel fuel comprises a biodiesel.

3. The fuel composition according to claim 1 in which the α-hydroxymonocarboxylic acid is a lactic acid.

4. The fuel composition according to claim 1, wherein the $C_1$–$C_4$ alkyl ester of the α-hydroxymonocarboxylic acid is ethyl lactate.

5. The fuel composition according to claim 1, wherein the $C_1$–$C_4$ alcohol is ethanol.

6. The fuel composition according to claim 1, wherein contains from 3 to 6% by weight $C_1$–$C_4$ alkyl ester, calculated on the basis of the total weight of the composition.

7. The fuel composition according to claim 1, wherein contains from 4 to 5% by weight $C_1$–$C_4$ alkyl ester, calculated on the basis of the total weight of the composition.

8. The fuel composition according to claim 1, wherein contains from 4 to 5% by weight $C_1$–$C_4$ alkyl ester and 0.1 to 0.5% by weight $C_1$–$C_4$ alcohol, calculated on the basis of the total weight of the composition.

9. The fuel composition according to claim 1, wherein the fuel composition comprises a diesel fuel which has been prepared from middle distillates.

* * * * *